July 8, 1952  N. E. HART  2,602,414
UNIT ASSEMBLY-ROTATABLE DIAL
Filed May 10, 1950  2 SHEETS—SHEET 1
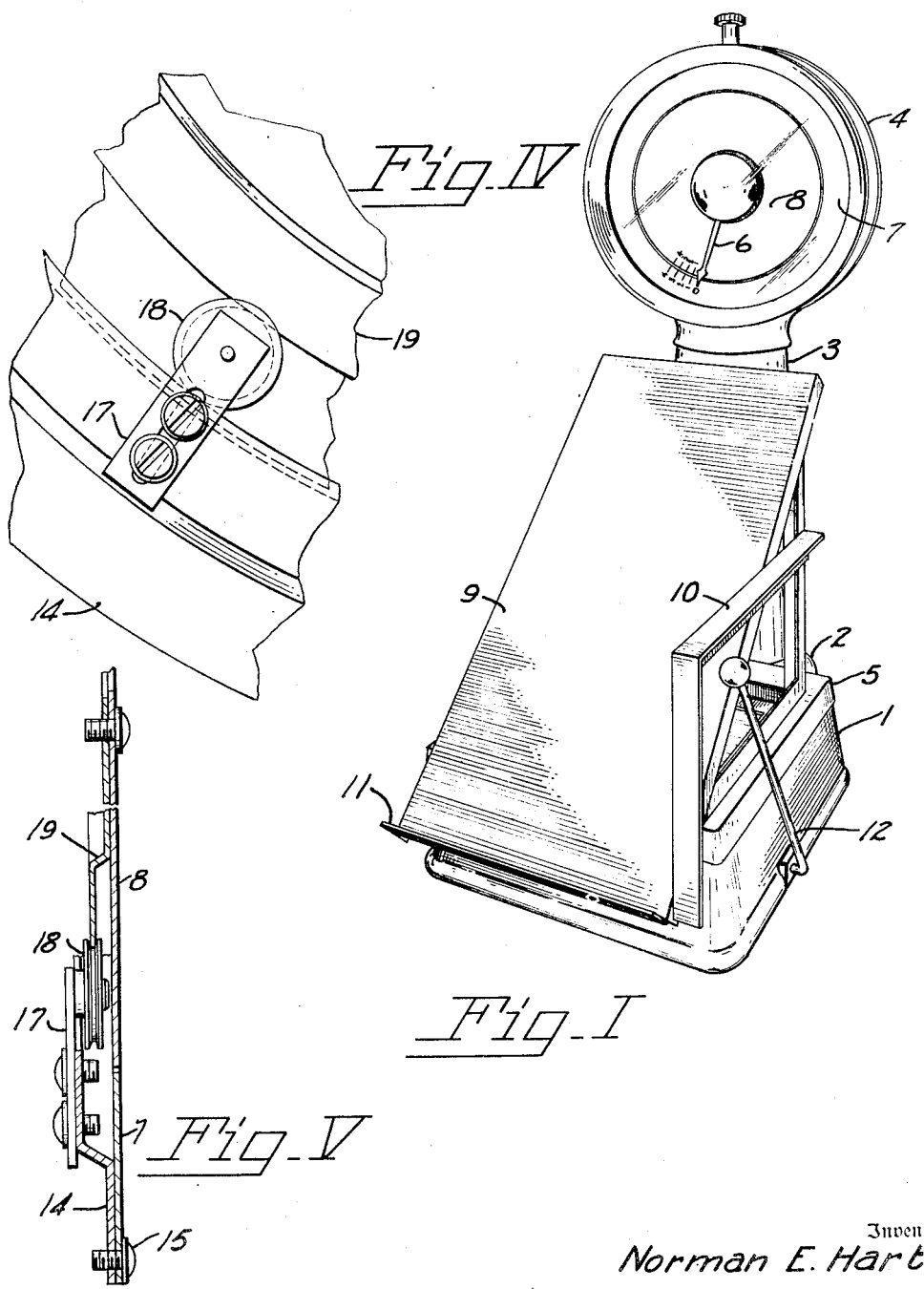
Inventor
Norman E. Hart
By Marshall, Marshall & Leonard
Attorneys

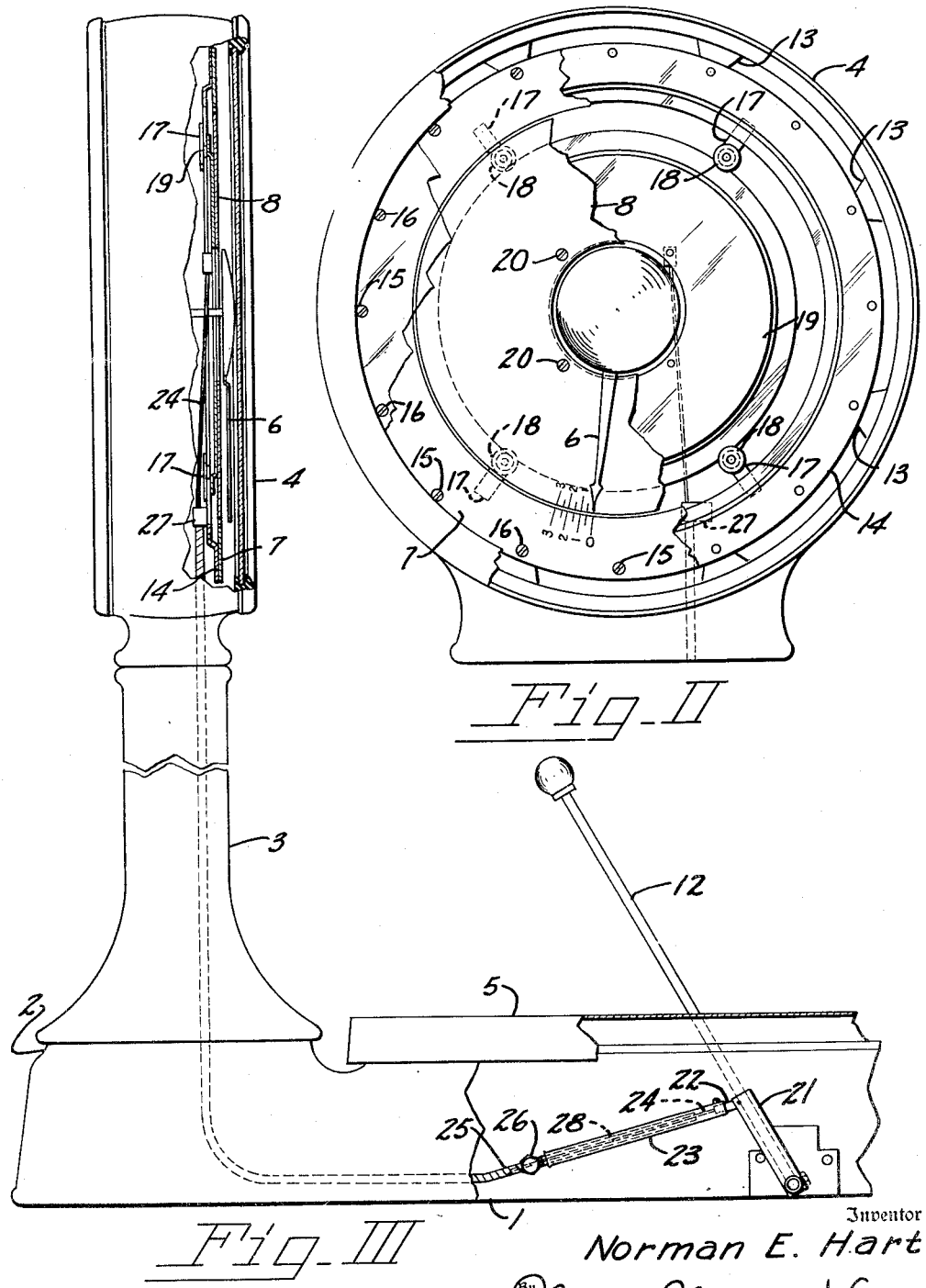

Patented July 8, 1952

2,602,414

UNITED STATES PATENT OFFICE 2,602,414

UNIT ASSEMBLY-ROTATABLE DIAL

Norman E. Hart, Toledo, Ohio, assignor to Toledo Scale Company, Toledo, Ohio, a corporation of New Jersey Application May 10, 1950, Serial No. 161,065

3 Claims. (Cl. 116—129)

This invention relates to weighing scales and in particular to a subassembly comprising a rotatable dial chart that may be easily substituted for the fixed chart of a dial weighing scale and which may be rotated with respect to the indicating mechanism so that gross and net weight indications may be simultaneously exhibited.

Weighing scale dials have been constructed so that the dial may be rotated with respect to the indicating mechanism for the purpose of subtracting the tare weight thus leaving the dial and indicator to indicate the net weight of the article. These known rotatable dial mechanisms are difficult to construct and to install in a weighing scale and are therefore expensive and not entirely satisfactory.

The principal object of this invention is to provide a simplified dial assembly having a rotatable dial portion, which assembly may be easily substituted for the usual stationary chart without requiring material alteration of any other portion of the weighing scale.

Another object of the invention is to provide a weighing scale chart assembly in which a disk portion is rotatably mounted on an annular portion which in turn is mounted in the dial housing of the scale in lieu of the usual annular chart.

More specific objects and advantages of the invention are apparent from the following description in which reference is made to the accompanying drawings.

In the drawings:

Figure I is a perspective view of a weighing scale equipped with a special loading rack and a dial assembly constructed according to the invention.

Figure II is a front elevation, with parts broken away, of a dial housing and the improved chart assembly.

Figure III is a side elevation, with parts broken away, to show the improved dial mechanism and the control for operating it.

Figure IV is a fragmentary rear elevation of a portion of the improved dial mechanism showing, in particular, one of the rollers that carry the rotatable portion of the dial assembly.

Figure V is a cross section of the improved dial assembly showing the cooperation between one of the rollers and an annular support carrying the rotatable dial.

These specific figures and the accompanying description are intended merely to illustrate the invention but not to limit its scope.

For the purpose of illustration a rotatable dial assembly constructed according to the invention is shown as it is employed in a bench type weighing scale. Such a scale comprises a generally rectangular base 1 having a protruding nose portion 2 from which a column 3 is erected to carry a dial housing 4. A lever system contained in the base 1 supports a load receiving platform 5 and transmits load forces to a load counterbalancing mechanism enclosed in the dial housing 4. The load counterbalancing mechanism is operatively connected to an indicator 6 arranged to sweep over a stationary annular chart 7 and a rotatable disk chart 8 and to cooperate with indicia on the charts to indicate the magnitude of the load on the load receiving platform 5.

To facilitate the use of this scale in the packing of commodities into cartons or crates the scale is provided with an inclined rack having a guard railing 10 along one side and an upstanding lip 11 along the bottom edge. A handle 12 located just below the guard railing 10 of the inclined rack is operatively connected through a flexible cable in the base 1 and column 3 to the rotatable dial 8 so that movement of the handle 12 produces corresponding rotation of the disk chart 8.

In the operation of this scale an empty carton is placed on the inclined rack 9 and the handle 12 manipulated until the zero indicium on the rotatable chart is in registry with the indicator 6. As the produce or other material is packed in the carton or crate the indicator 6 sweeps over the charts and in cooperation with indicia on the annular chart 7 indicates the gross weight of the container and produce, and in cooperation with the rotatable chart 8 indicates the net weight of the produce or material in the carton or container. As soon as the carton or container has been loaded to the desired net weight it is removed and sealed and the next carton or container is put in place.

Referring now to Figure II, the improved dial assembly is mounted within the watchcase shaped dial housing 4 by means of inwardly directed lugs 13 to which the annular chart 7 and a backing strip 14 are attached. The annular chart 7 and the backing strip 14 are fastened together by a plurality of screws 15 independently of screws 16 which passing through the annular chart 7 and backing strip 14 are threaded into the lugs 13 to hold the assembly in place. The radially innermost part of the backing strip 14 is displaced rearwardly of the plane of the remainder of the backing strip, as may be seen in Figures III and V, to support a plurality of adjustable brackets 17 on which grooved rollers 18 are journaled. The grooved rollers 18 engage and support the rim of a rotatable dial support 19, which rim is displaced out of the plane of the remainder of the rotatable support. Preferably the amount of such displacement is such that the flat surface of the rotatable support 19 is in the same plane as the annular backing strip 14 of the chart 7.

The disk chart 8 is concentrically mounted on the rotatable support 19 by means of a plurality of screws 20 and is of such diameter that it fits closely in the inner periphery of the annular chart 7 and is substantially co-planar therewith. Care is taken in mounting the disk chart 8 on the rotatable support 19 so that they are exactly concentric. The brackets 17 (see Figure IV) are slotted to permit radial adjustment so that the rotatable chart 8 may be brought into exact or nearly exact concentricity with respect to the annular chart 7.

As was mentioned previously, the inner periphery of the annular chart 7 and the outer periphery of the disk chart 8 carry indicia for indicating the magnitude of the load. To show the tare and net weight the rotatable chart 8 is rotated so that its zero indicium is in registry with the indicator 6 when the tare load only is on the scale. The amount of the tare load may be read from the indicia of the stationary chart 7.

As indicated, the rotation of the rotatable chart 8 is produced by movement of the handle 12. The handle 12 operates an arm 21 located within the base 1. The arm 21 is pivotally attached to a fitting 22 and sleeve 23. A steel wire 24 attached to the fitting 22 is threaded through a flexible conduit 25 one end of which is clamped in a fitting 26 and the other end of which is secured to a fitting 27 attached to the backing strip 14 in the dial housing 4. The steel wire 24 extends beyond the fitting 27 and at its end is attached to the rotatable support 19. In this assembly the rotatable dial 8 may be easily and quickly brought to registry with the indicator 6 and since there is no interference or change in the condition of the balance of the scale the operation may be carried out very rapidly.

Although the rotatable chart 8 may be easily moved, provision against buckling of the wire 24 at the end of the tube 23 is made by attaching a second tube 28 to the end of the flexible conduit 25 with the second tube 28 telescoped within the first tube 23. The telescoping of the tubes keeps the wire in proper alignment and therefore eliminates any possibility of trouble arising because of a bent wire.

The improved dial assembly may be removed from the dial housing by merely disconnecting the fitting 27 and the wire 24 and removing the mounting screws 16 whereupon the dial assembly is completely free of the dial housing and is yet a complete subassembly with all of its parts in accurate alignment. This combination of elements to form a complete subassembly makes it possible, in the manufacture of the scale, to accurately align the various of the parts of the assembly on fixtures external to the scale. Having once aligned the various parts the assembly may be installed in the dial housing with assurance that the parts are all in their correct operative positions.

While in the illustrated embodiment the charts are shown in a co-planar relation this is not critical since the only function to be served is that one indicator assembly be able to cooperate with the indicia on both the stationary annular and rotatable disk charts.

Various modifications in specific details of construction may be made without losing the advantages of a complete subassembly that may be installed or removed from the scale as a whole and which may be located in precisely the same manner and in the same space as the conventional stationary chart is mounted.

Having described the invention, I claim:

1. In a rotatable dial assembly for a weighing scale, in combination, an indicia bearing annular chart that is mounted within the dial housing of the scale, a plurality of brackets attached to the chart and extending radially inward and toward the rear of the housing, a roller journaled on each bracket, a rotatable support carried on the rollers, a disk chart mounted on the support, said disk chart having indicia around its periphery located adjacent the indicia on the annular chart, and means for rotating the disk chart and support to vary the registry of the indicia.

2. In a rotatable dial assembly for a weighing scale, in combination, an indicia bearing annular chart that is mounted within the dial housing of the scale, a plurality of brackets attached to the chart and extending radially inward, a roller journaled on each bracket, a rotatable support carried on the rollers, a disk chart on the support and lying in the plane of the annular chart, said disk chart having indicia adjacent the indicia of the annular chart, and means for rotating the disk chart to vary the registry of the indicia.

3. In a rotatable dial assembly for a weighing scale, in combination, an indicia bearing annular chart that is mounted within the dial housing of the scale, a plurality of brackets mounted on the annular chart and directed radially inwardly, a grooved roller journaled on each bracket, a rotatable support carried on the grooved rollers, a disk chart mounted on the support and lying in the plane of the annular chart, and means for rotating the disk chart.

NORMAN E. HART.

REFERENCES CITED

The following references are of record in the file of this patent:

UNITED STATES PATENTS

| Number | Name | Date |
|--------|------|------|
| 304,546 | O'Grady | Sept. 2, 1884 |
| 1,038,291 | Cassell | Sept. 10, 1912 |
| 1,371,371 | Hinsman | Mar. 15, 1921 |
| 1,623,820 | West | Apr. 5, 1927 |